UNITED STATES PATENT OFFICE.

WALTER S. CROWELL, OF PHILADELPHIA, PENNSYLVANIA, ASSIGNOR TO THE S. S. WHITE DENTAL MANUFACTURING COMPANY, A CORPORATION OF PENNSYLVANIA.

DENTAL CEMENT.

1,245,879.   Specification of Letters Patent.   Patented Nov. 6, 1917.

No Drawing.   Application filed August 2, 1915.   Serial No. 43,195.

*To all whom it may concern:*

Be it known that I, WALTER S. CROWELL, a citizen of the United States, and a resident of the city of Philadelphia, county of Philadelphia, State of Pennsylvania, have invented certain new and useful Improvements in Dental Cements, of which the following is a specification.

My invention relates particularly to cements adapted to be used in the art of dentistry, and is especially directed to that class of cements which are usually employed in stopping or filling the cavities of natural teeth, and for setting crowns, bridges and inlays.

The principal objects of my invention are, to provide a cement that exhibits the characteristic germicidal, antiseptic, sedative and coagulative action of silver salts in a mild and controllable manner, and that tends to harden the tooth structure.

Other objects of my invention are, to provide a silver cement of such peculiar composition that the silver salt contained therein cannot extend beyond a limited zone and cause discoloration of the teeth.

My invention also comprehends a cement powder, which when compounded with a suitable liquid to a mass of the proper consistency for the purpose and allowed to set, will continue to manifest germicidal and antiseptic action upon its surroundings, so as to inhibit the recurrence of dental caries or decay of the teeth.

It is well known to the profession that silver nitrate has been suggested and employed as an agent to check the progress of dental caries, and that objections to its use have been chiefly the inconvenience of its application, the danger of its coming into contact with the mucous surfaces or adjacent teeth causing escharging of the former and discoloration of the latter. Because of its solubility in aqueous fluids, silver nitrate cannot be retained permanently localized in a cavity except by sealing it in with some filling material.

Many of these objections have been overcome by the use of copper cements, which possess germicidal, sedative and antiseptic properties similar to silver salts, but to a much less degree. They do not, however, exhibit any of the very desirable hardening and coagulative action of silver salts. The ratio of germicidal properties, according to Flügge, is about 1 to 200 in favor of silver. It is therefore necessary to use copper in a much more concentrated form, which increases the liability of a cement containing it to discolor, when subjected to the action of the saliva, the food and the gasses emanating from the stomach. It has been found that copper cement is disadvantageous, in that copper salts have no coagulating action upon albuminous solutions, such as the fluids of the dentinal canals, and therefore, not being self-limiting, are able to diffuse throughout a considerable volume of tooth structure and cause widespread discoloration.

After considerable research and experimentation, I have devised a compound containing a silver salt which is susceptible of being rendered slightly soluble to permeate the dentinal tubuli, and which has the peculiar, but to be desired, characteristics of being self-limiting in the extent of its action by forming a zone of coagulated proteid substances and silver-proteid compounds, beyond which the silver salts cannot extend to permeate the tooth structure and cause widespread discoloration.

I have found in practice that a desirable composition which exhibits the characteristic germicidal, antiseptic, sedative and coagulative action of the silver in a mild and controlling manner, may preferably contain, in composition with an ordinary dental oxyphosphate of zinc cement powder, an orthophosphate of silver compound adapted to have a setting reaction with phosphoric acid solution. Upon mixing this powder with a phosphoric acid solution containing the other ingredients necessary to make it suitable for the purpose, the silver phosphate dissolves in the solution, and the resulting acid phosphate of silver being soluble in water exhibits the characteristic germicidal, antiseptic, sedative and coagulative action of silver. Upon setting, the zinc oxid unites with the acid phosphate of silver, forming zinc phosphate and the neutral phosphate of silver. Therefore, after setting there is not a strong and continued action of silver upon the tissue, but rather only a mild germicidal action of the very slightly soluble silver phosphate contained in the cement.

The same result may be obtaitned by dissolving the phosphate, carbonate, oxid, or hydroxid of silver, or any other salt of silver which is soluble, in the cement liquid, thereby forestalling the solution of silver compound from the powder, but producing the same action upon the tissue and the same final product.

Although I have described the filling composition as preferably containing orthophosphate of silver, it is to be understood that meta or pyrophosphate of silver may be employed with substantially equal results, or that other salts of silver may be substituted for the phosphates, such as borates, silicates, chlorid, bromid, iodid, or, in fact, almost any inorganic salt of silver, with but few exceptions, and many organic silver compounds. My invention is advantageous in that the silver cement fixes the pathological tissue and protects the sound tissue with a wall of insoluble permanently aseptic albumin coagulum, thus preventing the recurrence of dental caries.

Having thus described my invention, I claim:

1. A composition comprising a filling material containing cement powder and a germicidal silver salt.

2. A composition comprising a filling material containing oxyphosphate of zinc cement powder and a germicidal silver salt.

3. A comopsition comprising a filling material containing oxyphosphate of zinc cement powder and a slightly soluble germicidal silver salt.

4. A composition comprising a filling material containing oxyphosphate of zinc cement powder and silver phosphate.

5. A composition comprising a filling material containing a difficultly soluble germicidal silver compound, adapted to undergo a setting reaction when compounded with a phosphoric acid solution.

6. A composition comprising oxyphosphate of zinc cement powder and an acid phosphate liquid consisting partially of silver acid phosphate.

In witness whereof, I have hereunto set my hand this 30th day of July, A. D., 1915.

WALTER S. CROWELL.

Witnesses:
WILLIAM J. RUSSELL,
CLIFTON C. HALLOWELL.

Copies of this patent may be obtained for five cents each, by addressing the "Commissioner of Patents, Washington, D. C."